Aug. 23, 1932.  W. H. STUCK  1,873,359
OFFSET IMPLEMENT
Filed June 23, 1931
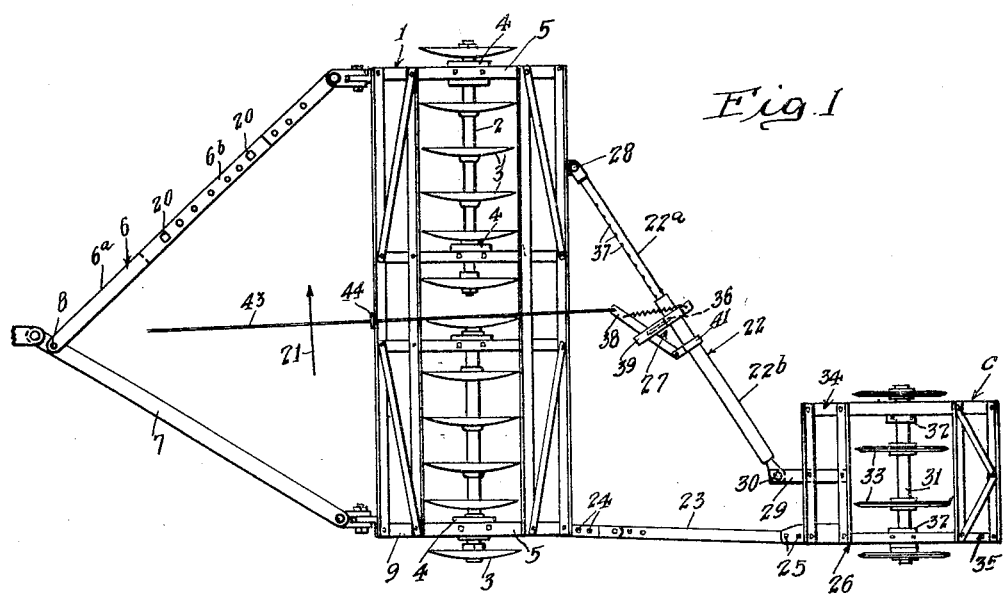
Fig.1
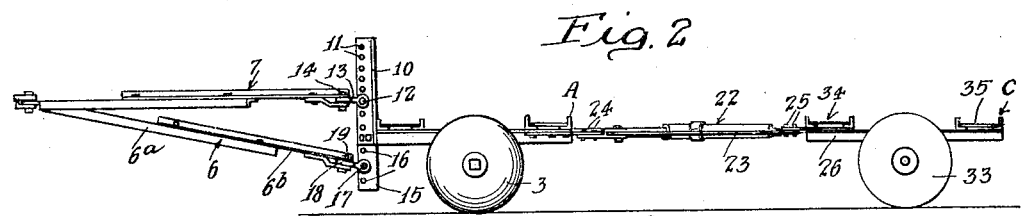
Fig.2
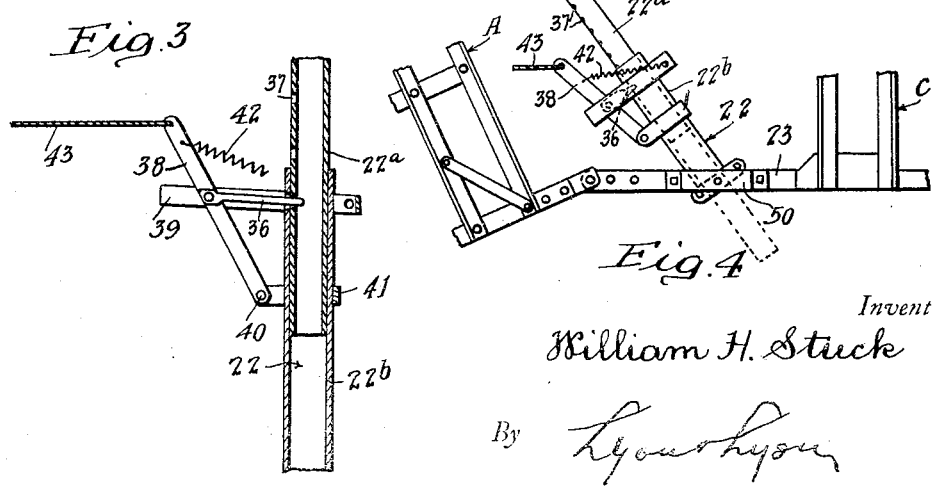
Fig.3
Fig.4
Inventor
William H. Stuck
By
Attorneys Patented Aug. 23, 1932

1,873,359

UNITED STATES PATENT OFFICE

WILLIAM H. STUCK, OF VENTURA, CALIFORNIA, ASSIGNOR TO KILLEFER MANUFACTURING CORPORATION, LTD., OF LOS ANGELES, CALIFORNIA, A CORPORATION OF CALIFORNIA

OFFSET IMPLEMENT

Application filed June 23, 1931. Serial No. 546,291.

This invention relates to agricultural implements of the offset type, and more particularly to a combination of a ground working implement with a unit coupled with the ground working implement for maintaining the ground working implement in position offset from the line of progression of a tractor to which the ground working implement is coupled, and which unit is of a non-cultivating character.

In the cultivation of the soil in orchards or in like places where cultivation is required close to a line of trees, other vegetation, fences or the like, it has heretofore been the practice to employ an offset single tandem disc harrow or other implement which could be offset in relation to the line of progression of the tractor.

In the use of such offset disc harrows it has been found that there is a decided tendency exerted to draw away from the trees the soil as it is cultivated due to the throw of the second or rear gang of discs.

It is therefore an object of this invention to provide an offset implement which may be used for the purpose of cultivating in offset position wherein there is provided a ground working implement and a non-cultivating unit acting as a stabilizer to hold the implement stable in offset position against the tendency of such unit or implement to travel laterally with relation to its line of progression.

Another object of this invention is to provide a ground working implement including means for cultivating the soil, means for connecting the cultivating means with a tractor so that the cultivating means will be drawn over the soil in position offset to the line of progression of the tractor, and means adjustably connected with the cultivating means for maintaining the cultivating means stable in offset position, and which stabilizing means is of a non-cultivating type.

Other objects and advantages of this invention it is believed will be apparent from the following detailed description of a preferred embodiment thereof as illustrated in the accompanying drawing.

In the drawing:

Figure 1 is a plan view of an implement embodying my invention.

Figure 2 is a side elevation thereof.

Figure 3 is an enlarged fragmental view of the latch means provided in the adjustable connection between the cultivating and noncultivating units of my invention.

Figure 4 is a fragmental view of a modified form of implement embodying my invention.

In the preferred embodiment of my invention illustrated in the accompanying drawing I have shown a cultivating unit comprising a gang of discs. My invention, however, is not limited to a cultivating unit consisting of the gang of discs, but is applicable for use in connection with other types of cultivating units wherein it is desired to pull such units in position offset from the line of progression of the tractor, and which cultivating units exert a tendency to travel sidewise or laterally of the line of progression of the implement.

The gang of discs A includes a frame 1 in which a disc gang rod 2 is mounted. Mounted on the disc gang rod 2 are a plurality of concavo-convex discs 3.

The gang rod 2 as illustrated in a divided gang rod facilitating the independent action of the discs 3 on the separate portions of the gang rod 2 as, for example, when turning corners or the like. The gang rod 2 is supported in the frame 1 in a plurality of bearings 4 secured to the cross members 5 of the frame 1.

In order to draw the cultivating unit consisting of the gang of discs A in offset position, and in order to maintain such gang of discs substantially level in a horizontal plane as they are drawn through the soil, I prefer to provide a hitch composed of a pair of rigid hitch bars 6 and 7 which are pivotally connected together as indicated at 8 at their forward end and are pivotally secured in vertically adjustable relation to or near the opposed corners of the frame 1 of the gang A. In order to hold the gang of discs A level in a horizontal plane, the draft bars 6 and 7 are connected to the frame 1 at different elevations and in order to accommodate for the tendency of the end 9 of the frame 1 to ride out of the ground. Due to the direction of concavity of the discs 3, the end 9 of the discs is provided with a standard 10 provided with a plurality of holes 11 into any one of which holes 11 the bolts 12 of the clevis 13 is adapted to pass.

The clevis 13 is pivotally secured at its opposite end by the bolt 14 to the end of the draft bar 7. At the opposite end of the frame 1 there is secured a downwardly extending bracket 15 which is provided with a plurality of holes 16 into any one of which holes the bolt 17 of the clevis 18 is adapted to be passed. The opposite end of the clevis 18 is pivotally secured by means of a bolt 19 to the end of the rigid draft bar 6.

The rigid draft bar 6 is made adjustable in length by constructing the same of two portions of angle bar 6a and 6b connected together by means of bolts 20 for the purpose of adjusting the offset position at which the discs 3 cultivate the soil. By adjusting the length of the bar 6, the degree of offset from the line of progression of the implement is controlled. The bar 7 is likewise made adjustable in length to enable the variation of the position of the implement in relation to the draft tractor when the offset position is changed.

As the discs 3 are set in the gang A with all of their concavities turned in one direction, that is, away from the end 9, the disc gang A has a tendency to travel laterally in the direction of the arrow 21 of the line of progression of the implement. In order to stabilize this tendency to travel laterally of the line of progression of the implement and to enable the implement to be adjusted to the desired degree of offset while not interfering with the direction of throw of soil by the discs 3, I provide a stabilizing non-cultivating unit C which is adjustably coupled with the gang A by means of an adjustable coupling bar 22 and a non-adjustable draft bar 23. The non-adjustable draft bar 23 is pivotally secured as indicated at 24 to the corner of the frame 1 at one end and is rigidly secured at 25 to the frame 26 of the stabilizing unit C.

The adjustable coupling bar 22 is formed of two telescoping sections 22a and 22b which are telescopically connected together and adjustably held with respect to their telescopic action by means of a ratchet 27. The forward end of the bar 22 is pivotally secured to the frame 1 at a pivot 28 located at a point substantially moved from the pivot 24 preferably to the opposite side of the longitudinal center of the implement provided by the gang A. The opposite end of the bar 22 is pivotally connected to a bracket 29 secured to the frame 26 of the non-cultivating unit C as indicated at 30.

The non-cultivating unit C comprises a frame 26 within which a gang rod 31 is pivotally supported by bearings 32. Mounted upon the gang rod 31 are a number of plain flat discs 33 which may be drawn through the soil without materially cultivating the soil and without throwing the soil in either direction. The frame 26 of the unit C is formed to provide front and back weight boxes 34 and 35 within which heavy weights may be mounted for causing the discs 33 to penetrate the soil.

The control bar 22 provides the angle adjusting bar for controlling the angularity of the gang A of discs or for controlling the working angle to which the discs 3 are adjusted. In order to permit this adjustment to be made while the tractor is progressing, the ratchet 27 is provided. The ratchet 27 includes a ratchet pin 36 adapted to pass through a hole 37 formed in the member 22b and into any one of a series of holes 37 formed in the inner telescoping member 22a.

The ratchet pin 36 is pivotally supported by a lever 38 which is guided in a guide 39, secured to the outer telescoping member 22b. The rear end of the lever 38 is pivotally supported by a pin 40 in a bracket 41 secured to the outer telescoping member 22b. A spring 42 is interposed between the lever 38 and the guide bracket 39 normally tending to urge the pin 36 into position to pass into one of the holes 37 of the inner telescoping member 22a. The forward end of the lever 38 is provided with a rope 43 which extends forwardly from the ratchet lever 38 through an eye 44 mounted on the frame 1 of the gang A to the operator of the implement upon the seat of the tractor.

In the modified form of my invention illustrated in Figure 4, similar numbers indicate similar parts and this modification differs only from the modification of my invention illustrated in Figures 1 to 3 inclusive in that the telescoping bar 22b is pivotally mounted in a bearing bracket 50 pivotally secured to the non-adjustable draft bar 23 so as to permit the telescoping bar 22a to slide through the telescoping tube 22b beyond the end of the draft bar 23 when the two units, the cultivating unit A and the non-cultivating unit C are brought together at their normally open ends when the implement is turned to the right or in a direction around the concave faces of the discs 3.

The implement embodying my invention operates as follows:

The length of the offset bar 6 is adjusted to provide for the desired degree of offset of the cultivating unit A. The non-cultivating unit C is weighted by placing weight in the weight boxes 34 and 35 to maintain the discs 33 running straight or in the line of progression of the implement. The implement is then driven forwardly, turned to the left or backed and the rope 43 is actuated to release the ratchet 27 and permit the bar 22a to telescope out of the bar 22b.

As the length of the bar 22a increases, the discs 3 assume their working position and become angled to the line of progression of the implement. When the desired angularity is placed in the discs 3, the rope is released and the pin of the ratchet 27 passes into its required hole 37 in the inner telescoping bar 22a, and the implement may be driven ahead straight.

The adjustable coupling bar 22 not only provides a means for permitting the cultivating unit A to be angled into angled position in relation to the non-cultivating unit C, but likewise provides a means for permitting the cultivating unit A to pivot with relation to the non-cultivating unit C when the implement is turned particularly to the right when the latch pin is released to permit the two sections of the bar 22 to telescope together.

The length of the member 22, in order to permit turning of the implement to the right, is controllable through the latch means provided from the draft implement and shortens as the implement is turned to the right due to the tendency of the cultivating unit A to follow the movement of the draft implement, thereby swinging the outer end of the cultivating unit A rearwardly toward the non-cultivating unit C when the latch is released to shorten the adjustable bar 22.

This operation is permitted especially in the modified form illustrated in Figure 4 where the inner telescoping bar 22a is permitted to slide through the member 22b beyond the end of the non-cultivating unit C.

Having fully described my invention, it is to be understood that I do not wish to be limited to the details herein set forth, but my invention is of the full scope of the appended claims.

I claim:

1. In an offset tractor drawn implement, the combination of a ground working member, a rigid hitch for connecting the ground working member with the tractor, to draw the ground working member in offset position from the line of progression of the tractor, the ground working member including a plurality of ground working tools which, when moved to ground cultivating position, tend to cause said member to travel in a direction transverse to the line of travel of the tractor, a stabilizing element, and means for operatively connecting the stabilizing element to said ground working member.

2. In an offset tractor drawn implement, the combination of a ground working unit, a hitch connected with the ground working unit, a stabilizing unit, and means for adjustably coupling the stabilizing unit to the rear of the ground working unit to hold the ground working unit stable in offset position.

3. In an offset tractor drawn implement, the combination of a ground working unit, a rigid hitch connected with the ground working implement and including an offset bar, means for adjusting the length of the offset bar to adjust the offset position of the ground working unit relative to the line of progression of the tractor, a stabilizing unit, and means for adjustably coupling the stabilizing unit to the rear of the ground working unit to hold the ground working unit stable in offset position.

4. In an offset tractor drawn implement, the combination of a ground working unit, a rigid hitch connected with the ground working implement and including an offset bar, means for adjusting the length of the offset bar to adjust the offset position of the ground working unit relative to the line of progression of the tractor, a stabilizing unit, means for adjustably coupling the stabilizing unit to the rear of the ground working unit to hold the ground working unit stable in offset position, the latter said means including an angle adjusting bar operably connected between the ground working unit and the stabilizing unit, and a latch means for controlling the length of said angle adjusting bar.

5. In an offset tractor drawn implement, the combination of a ground working unit, a hitch connected with the ground working unit, a stabilizing unit, a non-adjustable draft bar pivotally connected with the ground working unit and the stabilizing unit, and an adjustable coupling bar adjustable in length pivotally connected between the ground working unit and the stabilizing unit.

6. In an offset tractor drawn implement, the combination of a ground working unit, a hitch connected with the ground working unit, a stabilizing unit, a non-adjustable draft bar pivotally connected with the ground working unit and the stabilizing unit, an adjustable coupling bar adjustable in length pivotally connected between the ground working unit and the stabilizing unit, and a latch means operable from the tractor for controlling the length of said adjustable coupling bar to vary the working angle of the ground working unit as the implement is drawn by the tractor.

7. In an offset tractor drawn implement, the combination of a single gang of discs, the single gang of discs including a disc gang rod having a plurality of concave convex discs mounted thereon, the concavities of which are all turned in one direction, a rigid hitch for connecting the single gang of discs with the tractor to draw the gang of discs in offset position from the line of progression of the tractor, a stabilizing unit, and means connecting the stabilizing unit with the disc gang, including means for adjusting the relative length of said connecting means when the disc gang is moved to cultivating position.

8. In an offset tractor drawn implement, the combination of a single gang of concave convex discs, a hitch connected with the gang of discs, a stabilizing unit, and means for adjustably coupling the stabilizing unit to the rear of the gang of discs to hold the ground working unit stable in offset position.

Signed at Ventura, California, this 25th day of May, 1931.

WILLIAM H. STUCK.